Oct. 16, 1951  S. R. RICH ET AL  2,571,762
MAGNETIC CLUTCH
Filed Jan. 22, 1949  2 SHEETS—SHEET 1

INVENTOR.
Stanley R. Rich
BY Karl D. Kysor

ATTORNEYS

Oct. 16, 1951  S. R. RICH ET AL  2,571,762
MAGNETIC CLUTCH

Filed Jan. 22, 1949  2 SHEETS—SHEET 2

INVENTORS
Stanley R. Rich
Karl D. Kysor
BY
Owen & Owen
ATTORNEYS

Patented Oct. 16, 1951

2,571,762

UNITED STATES PATENT OFFICE 2,571,762

MAGNETIC CLUTCH

Stanley Robert Rich, Newton Center, Mass., and Karl D. Kysor, Birmingham, Mich., assignors to Kysor-Rich Corporation, Detroit, Mich., a corporation of Michigan Application January 22, 1949, Serial No. 72,142

5 Claims. (Cl. 172—284)

This invention relates to a magnetic clutch and is particularly directed to a clutch in which the force tending to move the driven elements in the same direction as the driving elements is derived from the hysteresis forces of a number of permanent magnets.

The primary object of the invention is to provide a simple and efficient magnetic clutch requiring low energizing power and thus suitable for use in various applications including automotive vehicles.

Another object of the invention is to provide a magnetic clutch in which the developed torque is substantially independent on the relative speed of rotation of the driving and driven elements.

Another object of the invention is to provide a magnetic clutch in which full torque is transmitted from the driving to the driven elements at zero slip or when the driving and driven elements are moved synchronously.

Still another object of the invention is to provide a simplified form of clutch in which a plurality of plates of permanent magnet material are used, the plates being demagnetized whenever no energizing force is applied to the clutch and polarized rapidly when the clutch is energized, the transmitted torque being dependent on the degree of energization of the clutch magnetizing elements.

Still another object of the invention is to provide a magnetic clutch in which the time constants of engagement and disengagement may be selected at will so that the clutch may be readily adapted for use in automotive vehicles and in other applications.

Figure 1:
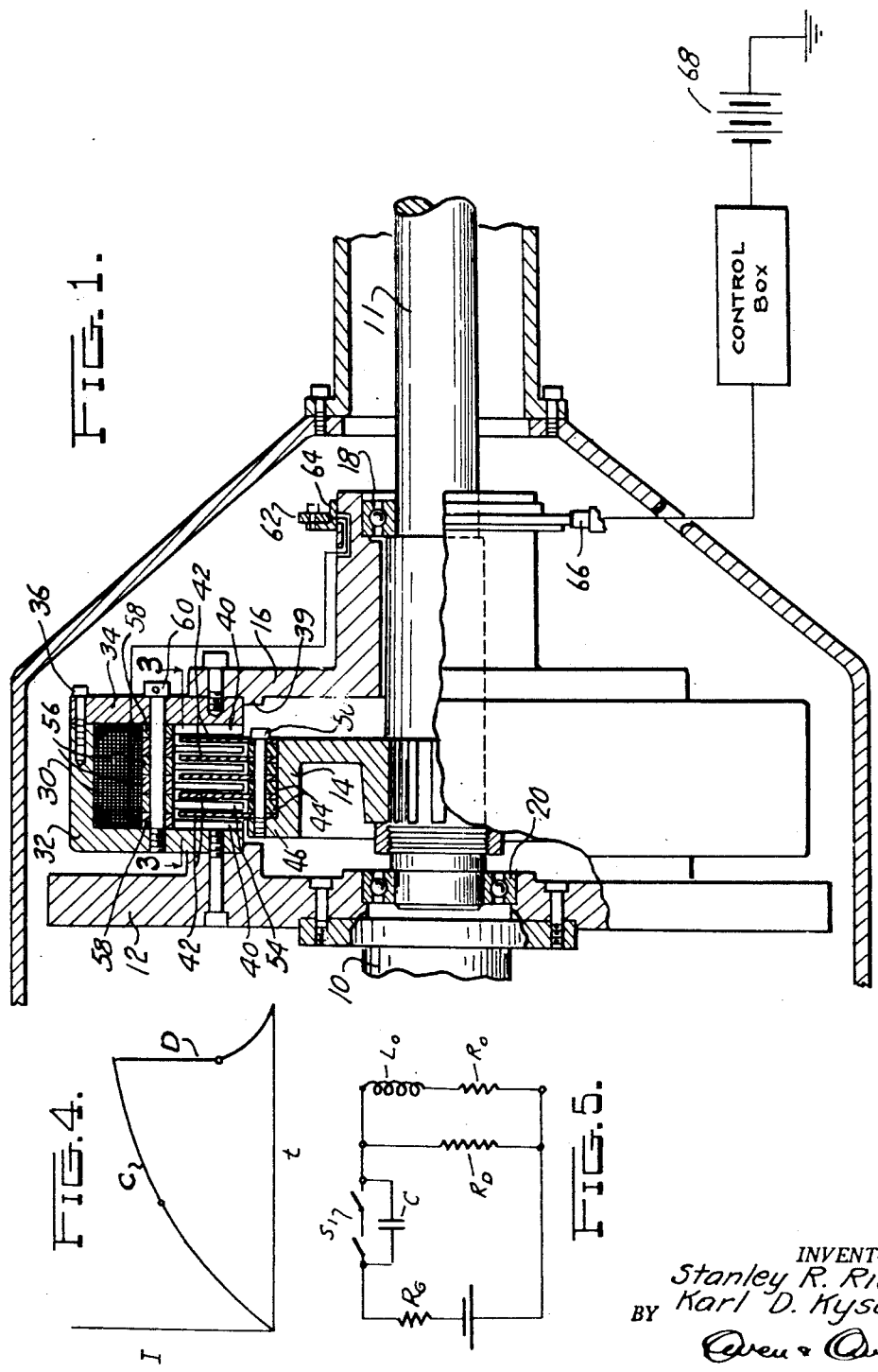
Figure 2:
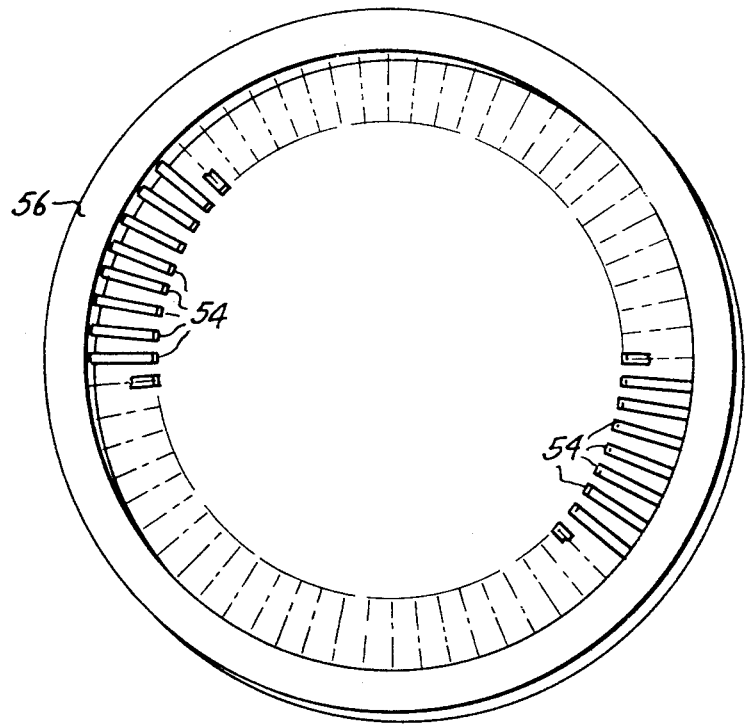
Figure 3:
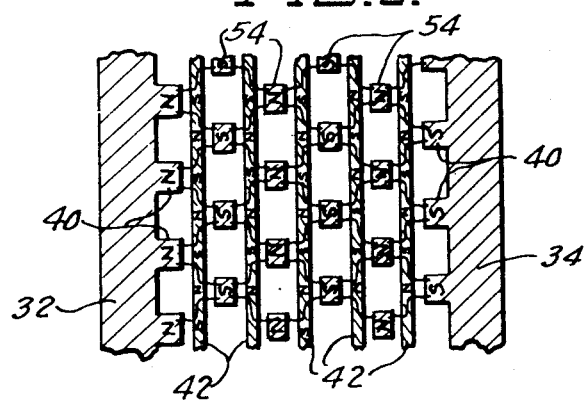

Other objects and advantages of the invention will become apparent from the following specification, reference being had to the accompanying drawings in which:

Fig. 1 is a central vertical section of a magnetic clutch embodying the present invention; Fig. 2 is a perspective view of one of the members comprising the rotating system; Fig. 3 is a section on line 3—3 of Fig. 1; Fig. 4 is a graphical representation of typical clutch energizing and deenergizing action; and Fig. 5 is a typical equivalent circuit diagram.

Referring to the drawings the clutch is shown in an execution suitable for use in automotive vehicles, being substantially of the form shown in the co-pending application of Karl D. Kysor, Serial No. 48,489, filed September 9, 1948, now abandoned. The clutch is interposed between a drive shaft 10 and a driven shaft 11 and is connected to a flywheel 12 that is in turn connected to the drive shaft. The driven elements of the clutch are carried by a spider or arm 14 connected by splines to the driven shaft 11 and the driving elements are supported, in addition to the support afforded by flywheel 12 by a rear plate or disc 16 journalled over an anti-friction bearing 18. The bearing 18 together with a front bearing 20 are used to maintain the concentricity of the driving and driven elements.

In its preferred form the clutch, in accordance with the present invention derives its energizing flux from a single large coil 30 disposed concentrically with the driving and driven shafts and having a winding direction peripheral with respect to such shafts. Any required number of turns may be incorporated in the winding and the magnetic field set up thereby will thus be axial with respect to the driving and driven shafts. The coil 30 is carried in a housing or bell 32 having an open side in which the assembly may be made, this side being closed by a ring 34 held in assembled relation by a plurality of studs 36. The housing 32 is bolted or otherwise fixed to flywheel 12 and a rear supporting plate may be fixed to ring 34 and a registration flange 39 may be provided to maintain the proper radial disposition of the parts. The housing 32 and its closing ring 34 are constructed of magnetic material such as steel and the flywheel 12 and the rear supporting plate 16 are preferably constructed of non-magnetic material such as aluminum or brass. The coil 30 is preferably "potted" in the cavity of housing 32 as in common transformer practice to prevent rotary displacement of the coil relative to the housing.

The inner surface of housing 32 and the facing surface of ring 34 are each formed with a series of tooth-like projections 40 extending radially and in a circular series so that the teeth define poles or flux concentration points in the magnetic circuit energized by coil 30 and set up in housing 32 and its closing ring 34.

A series of flat plates 42 of a highly permeable permanent magnetic material preferably of the known series of the aluminum-nickel-cobalt type or the copper-nickel-cobalt type are provided and are held in spaced relation to each other by intervening spacer rings 44 on a flange 46 at the end of the arm 14 which is fixed to or carried by the driven shaft 11. While the arm may be splined on the shaft care must be taken to maintain the axial disposition of the parts, as by providing a definite shoulder or stop on the shaft against which the arm is forced in assembly. The mounting flange and its supporting arm are made of non-magnetic material and a similar material is used in the flange 46 which is preferably integral with the arm so that all flux originating in teeth 40 must pass through the plates 42. Fastening studs 50 for the spacer rings 44 and the plates 42 are likewise of non-magnetic material and since the studs pass through the series of plates and spacer rings a substantially solid mass is provided that may be rotated with the engine.

Interleaved between the plates of permanent magnet material are sets of fingers 54 shown in detail in Fig. 2. Each set of fingers 54 comprises a series of radially disposed, substantially rectangular bodies of steel or similar material capable of transmitting magnetic flux between the plates and in the magnetic circuit between the teeth 40. The fingers 54 are preferably made integral with supporting rings 56 of non-magnetic material as by casting the ring around a prespaced set of fingers. Spacer rings 58 of proper thickness are provided for the series of rings 56 and the entire assembly of spacer rings 58 and finger carrying rings 56 are held in place firmly by studs 60 passing through openings in closure ring 34 and threaded into the opposite wall of housing 32. The studs 60 are, of course, made of non-magnetic material and the orientation of the rings 56 and fingers 54 is such that the fingers of one group lie midway between the fingers of the groups of each facing series and midway between the teeth 40 in which the flux originates. There are thus formed the series of magnetic paths indicated in Fig. 3 comprising the poles or teeth 40, plates 42 and fingers 54 with the fingers forming parasitic poles in the magnetic circuit.

One side of coil 30 is grounded and the other side is brought out to a suitable slip ring 62 carried by an insulating member 64 and receiving current from a brush 66 from the vehicle generator or from a battery 68. Control is so arranged that the coil 30 is energized at a predetermined rate taking into consideration the inductance of coil 30 and the reluctance of the magnetic circuit. An equivalent circuit is shown in Fig. 5 in which coil 30 is represented by an inductance $L_0$ and resistor $R_0$ in series. The vehicle battery has a small internal resistance indicated as $R_G$ and the control switch for the clutch is shown at $S_1$. The control switch may conveniently comprise a series of interlocked switches, one arranged adjacent the driver and the others operated, for example, by the vehicle doors in such a manner that unless all doors are closed with consequent closing of the associated switches no power can flow to the clutch.

A capacitor C is placed in parallel with the switches to prevent arcing across the switch points if one or more is opened when the clutch is under load.

It will be apparent from an inspection of the equivalent circuit that the charging time curve of the energizing coil is logarithmic and is equal to $$\frac{L_0}{R_0+R_G}$$

If the inherent resistance of the coil is not sufficiently great the charging time can be decreased by increasing the resistance $R_0$ and the clutch thus made to take hold or to reach full torque transmission more quickly.

On discharging, the time required depends on the impedance of the circuit including the coil when switch $S_1$ is opened. A resistor $R_D$ placed in parallel with the coil will effectively determine the discharging time constant of the coil circuit. The discharge time then becomes equal to $$\frac{L_0}{R_0+R_D}$$

and if $R_D$ is large, as compared with $R_0$ it will be found that the clutch may be made to take hold relatively slowly but to disconnect from the load very quickly. This action is indicated in Fig. 4 in which the slope of the charging time curve, designated C, is seen to be very gradual as compared to the discharge time curve D. The curves represent the increase and decrease in current in the energizing coil plotted against time.

As will be apparent from an inspection of Fig. 3 flux from the "poles" or teeth 40 passes into the first plate 42 and then flows in each direction in the plate to the poles formed opposite the first set of opposing fingers 54. Flux then passes into and out of the first set of fingers to the next plate where the flux again sets up definite areas of magnetization and permanent magnets are formed in a number equal to the number of points of flux concentration or fingers. If 60 fingers comprises a series there will be 120 poles or areas of definite magnetization in each of the plates.

Since the flux in one of the sets of poles or teeth 40 is from the same side of the magnetic circuit the flux is in the same direction and as one side of the magnetic circuit can be considered a series of north poles, so that the adjacent side of fingers 54 becomes a series of south poles as flux passes through and magnetizes the first plate 42. Since permanent magnets are formed in the first plate and in a similar manner in all of the plates it will be apparent that in order to move the permanent magnet material from the point opposite a north pole or tooth 42 to a point opposite the next succeeding north pole or tooth, that quantity of work must be done that is necessary to force the permanent magnet material through its entire hysteresis cycle; that is it must be completely demagnetized and remagnetized by the next north pole.

If $W_0$ units of work are expended in moving $V_0$ volume units of permanent magnet material past one pair of poles, the total work done in turning a plate through one revolution is $$W_T = W_0 \times \frac{V}{V_0} \times P$$

in which $W_T$ is total energy or work in watt-seconds
$W_0$ is defined above for a particular material and maximum flux density
$V_0$ is a unit volume of magnetic material
$V$ is the actual volume of magnetic material
$P$ is the number of poles formed in all plates Thus, $W_T$ watt-seconds are expended for every turn of the plates if they are forced to slip by the mechanical application of torque from an engine through drive shaft 10. It will be seen that the torque required is a constant depending on the magnetic characteristics of the plate material and is entirely independent of speed, down to zero speed at which there is no slip. This is the distinguishing characteristic of a hysteresis clutch over a clutch in which eddy currents are utilized to produce an "engaging" force or force tending to move the driven and driving elements together.

If power is expressed in the usual mechanical equation $P = TS$ in which T is torque and S is speed, the total energy is power multiplied by the time over which it acts or $$W = P \times t$$

Expressing speed as revolutions per unit time and substituting we have $$W = T \times S \times \text{time}$$

$$W = T \times \frac{\text{revolutions}}{\text{unit time}} \times \text{unit time}$$

from which the expression "unit time" may be cancelled leaving $$W = T \times \text{revolutions}$$

It will thus be seen that torque is present in the energy equation independent of speed. If we take the mathematical limit, allowing "W" and "revolutions" to become smaller and smaller, approaching zero, we see that torque remains constant.

It will also be seen from the above that the "no-slip" torque may be increased by increasing the number of poles formed, so that by increasing the number of fingers 107 in each set the torque that will be transmitted by the clutch can be increased. Further, the leakage flux is greatly minimized, and only a single energizing coil is required by the disposition of the parts, since there are no dissimilar poles on one side of a magnetic body.

The energy lost in rotating a given clutch plate through one revolution is directly proportional to the number of hysteretic cycles through which the permanent magnet material is forced in that revolution. Since the number of hysteretic cycles per revolution is directly equal to the number of pairs of poles in the energizing member, it is clear that the hysteretic loss, and therefore, the torque is directly proportional to the number of such pairs of energizing magnetic poles.

While a multiple plate clutch is shown in the preferred execution since more magnetic poles are available in this form, it will be appreciated that a single plate can be used, and that the continuity of the magnetic material peripherally need only be sufficient to overlay a pair of poles or teeth.

What we claim is:

1. A magnetic clutch for interposition between a drive shaft and a driven shaft comprising, means fixed to one of said shafts and forming a plurality of peripherally spaced similar magnetic poles, a facing body of permanent magnet material having a peripheral continuity at least sufficient to overlap an adjacent pair of said poles fixed to the other of said shafts, means facing the opposite side of said body forming opposite poles to said first means and completing magnetic circuit originating in the poles of said first means, said last named poles being staggered with relation to said first poles, and means to energize said poles.

2. A magnetic clutch in accordance with claim 1 in which said permanent magnet material comprises a disc.

3. A magnetic clutch for interposition between a drive shaft and a driven shaft comprising means fixed to one of said shafts and forming a plurality of peripherally spaced magnetic poles, a facing body of permanent magnet material fixed to the other of said shafts and having a peripheral continuity sufficient to at least overlap an adjacent pair of said poles, a magnetically permeable body carried by said first means and forming parasitic poles with respect to said facing body, a second facing body of permanent magnet material on the opposite side of said parasitic poles and similar in form to said first body of permanent magnet material, and means on the opposite side of said second body of permanent magnet material completing a magnetic circuit originating in said first poles, and means to energize said poles.

4. A magnetic clutch in accordance with claim 3 in which the poles formed in said first means, said parasitic poles, and the poles formed in said means on the opposite side of said permanent magnet material are all staggered with relation to the poles facing them.

5. A magnetic clutch for interposition between a drive shaft and a driven shaft comprising, means fixed to said drive shaft having teeth formed therein to define flux concentration points in a magnetic circuit, a facing body of permanent magnet material fixed to said driven shaft and having a peripheral continuity at least sufficient to overlap an adjacent pair of teeth, and means on the opposite side of said facing body of permanent magnet material and connected to said first means and having similar teeth in its facing surfaces to define flux concentration points and completing a magnetic circuit originating in said first teeth, said first and second sets of teeth being spaced in staggered relation to each other, and means to energize said magnetic circuit.

STANLEY ROBERT RICH.
KARL D. KYSOR.

REFERENCES CITED

The following references are of record in the file of this patent:

UNITED STATES PATENTS

| Number | Name | Date |
|--------|------|------|
| 912,504 | Steckel | Feb. 16, 1909 |
| 982,789 | Bowie | Jan. 31, 1911 |
| 1,424,769 | Morrison | Aug. 8, 1922 |
| 1,546,269 | Warren | July 14, 1925 |
| 2,183,404 | Morrill | Dec. 12, 1939 |
| 2,465,982 | Winther | Mar. 29, 1949 |
| 2,519,882 | Bullard | Aug. 22, 1950 |

FOREIGN PATENTS

| Number | Country | Date |
|--------|---------|------|
| 189,905 | Great Britain | Dec. 14, 1922 |
| 592,046 | France | Apr. 23, 1925 |